US011155346B2

United States Patent
Bennett et al.

(10) Patent No.: US 11,155,346 B2
(45) Date of Patent: Oct. 26, 2021

(54) AIRCRAFT LANDING GEAR AND PITCH TRIMMER ASSEMBLY

(71) Applicant: Safran Landing Systems UK Limited, Gloucester (GB)

(72) Inventors: Ian Robert Bennett, Gloucester (GB); Yann Simmonneaux, Gloucester (GB)

(73) Assignee: Safran Landing Systems UK LTD

( * ) Notice: Subject to any disclaimer, the term of this patent is extended or adjusted under 35 U.S.C. 154(b) by 127 days.

(21) Appl. No.: 16/715,549

(22) Filed: Dec. 16, 2019

(65) Prior Publication Data
US 2020/0198774 A1 Jun. 25, 2020

(30) Foreign Application Priority Data
Dec. 20, 2018 (EP) .................... 18214631

(51) Int. Cl.
*B64C 25/34* (2006.01)
*B64C 25/40* (2006.01)

(52) U.S. Cl.
CPC .............. *B64C 25/34* (2013.01); *B64C 25/40* (2013.01)

(58) Field of Classification Search
CPC .......... B64C 25/34; B64C 25/40; B64C 25/60
See application file for complete search history.

(56) References Cited

U.S. PATENT DOCUMENTS

| 2012/0318909 | A1* | 12/2012 | Bennett | B64C 25/34 244/50 |
| 2013/0119196 | A1* | 5/2013 | Lindahl | F15B 15/16 244/100 R |
| 2013/0233968 | A1* | 9/2013 | Goodburn | B64C 25/22 244/102 A |
| 2015/0097080 | A1* | 4/2015 | Holloway | B64C 25/34 244/102 A |
| 2015/0203195 | A1* | 7/2015 | Vatovec | B64C 25/34 244/103 R |
| 2015/0375856 | A1* | 12/2015 | Hodgkinson | B64C 25/34 244/104 R |
| 2016/0257398 | A1* | 9/2016 | Bennett | B64C 25/42 |
| 2018/0222599 | A1* | 8/2018 | Papadopoulos | B64C 25/58 |
| 2018/0339766 | A1 | 11/2018 | Didey et al. | |

FOREIGN PATENT DOCUMENTS

| EP | 2896517 A1 | 7/2015 |
| GB | 2510412 A | 8/2014 |

OTHER PUBLICATIONS

Extended European Search Report for European Application No. 18 214 631.6, dated Jun. 17, 2019, 8 pages.

* cited by examiner

*Primary Examiner* — Philip J Bonzell
*Assistant Examiner* — Tye William Abell
(74) *Attorney, Agent, or Firm* — RatnerPrestia

(57) ABSTRACT

An aircraft landing gear assembly having a bogie beam pivotally coupled to a support member, and a pitch trimmer assembly including a pitch trimmer actuator configured to exert a biasing force in a first direction and a bias force transmission assembly configured to receive the biasing force in the first direction and bias the bogie beam towards a predetermined neutral position relative to the support member irrespective of the initial position of the bogie beam.

10 Claims, 5 Drawing Sheets

AIRCRAFT LANDING GEAR AND PITCH TRIMMER ASSEMBLY

This application claims the benefit of European Application No. EP 18214631.6, filed on Dec. 20, 2018, which is incorporated herein by reference.

BACKGROUND OF THE INVENTION

The main landing gear of larger aircraft often have multiple axles on a bogie beam (or axle truck), with the bogie beam being pivotally coupled at an approximate mid-point to a support member of the landing gear assembly, typically an oleo-pneumatic shock strut. Such landing gear assemblies also often include a pitch trimmer assembly that is generally in the form of a telescopic actuator coupled between the bogie beam and a lower portion of the shock strut. The pitch trimmer assembly has a number of possible functions including controlling the position of the bogie beam relative to the shock strut during landing and take-off phases, where for example it is often desirable for the forward portion of the bogie beam, and hence forward axle and wheel set, to be angled upwards, i.e. angled towards the underside of the aircraft, during the initial portion of the landing phase. Other functions of the pitch trimmer assembly include placing the bogie beam in a desired orientation relative to the shock strut to facilitate storage of the landing gear assembly within the landing gear bay of the aircraft, and also for the pitch trimmer to provide a degree of damping of the pivoting motion of the bogie beam whilst the aircraft is moving across uneven ground.

Most bogie pitch trimmers are required to act as a spring to rotate, or bias, the bogie beam to a desired neutral position between two extremes of travel. This typically requires the pitch trimmer actuator to be capable of being driven in both directions of its travel, i.e. driven both towards an extended and a retracted position. This typically requires at least two dynamic seals or glands to provide seals between the actuating fluid, typically hydraulic fluid, held under pressure within the pitch trimmer actuator and the exterior of the pitch trimmer, as well as requiring, in the case of hydraulically actuated pitch trimmer actuators, hydraulic pressure lines attached to both sides of the hydraulic piston within the actuator, as well as at least one hydraulic return line.

A problem typically experienced with such hydraulic pitch trimmer actuators is a leakage of the actuating fluid at each of the dynamic seals. At a first approximation, this leakage is proportional to the number of dynamic seals (and their diameter, i.e. total circumferential length of dynamic sealing). Hence the ability to provide a centre-seeking pitch trimmer assembly having a reduction in the number and size of dynamic seals required would be beneficial.

EP 2896517 A1 describes an aircraft landing gear having two hydro-pneumatic shock absorber struts, the length of at least one of which can be actively controlled. GB 2510412 A describes a pitch trimmer for an aircraft landing gear having variable damping dependent on the relative position of the elements of the landing gear.

SUMMARY OF THE INVENTION

According to a first aspect of the present invention there is provided an aircraft landing gear assembly comprising a bogie beam pivotally coupled to a support member, the bogie beam having a predetermined neutral position relative to the support member, a pitch trimmer assembly including a pitch trimmer actuator configured to exert a biasing force in a first direction, and a bias force transmission assembly configured to receive the biasing force, wherein the bias force transmission assembly comprises a bias force transmission head at the free end of the pitch trimmer actuator and a pair of contact points on the bogie beam either side of the pivot axis of the bogies beam, the contact points being configured to receive the biasing force from the bias force transmission head and to define the predetermined neutral position of the bogie beam, wherein both contact points are in contact with bias force transmission head when the bogie beam is in the predetermined neutral position.

By providing an arrangement in which a biasing force acting in one direction only biases the bogie beam to a neutral position irrespective of the starting position of the bogie beam, a simplified actuator can be used. The bias force transmission assembly has the advantages of being relatively simple and robust and the advantage that the bias force is applied to one of the contact points if the bogie beam is not in the neutral position, and the pair of contact points limit the movement of the actuator when the neutral position is reached.

The pitch trimmer actuator may comprise a single gland linear actuator. This reduces the likelihood of fluid loss from the actuator. Preferably, the pitch trimmer actuator comprises a hydraulic actuator.

The pitch trimmer assembly may include a hydraulic accumulator. This allows the assembly to be self-contained, thus realising potential weight & packaging benefits.

The contact points may be asymmetrically shaped and/or located with respect to the pivot axis of the bogie beam. This allows the orientation of the bogie beam in the neutral position to be set.

The contact point of the bias force transmission assembly may alternatively comprise a cam profile, the bias force transmission head being configured to contact the cam profile and transmit the bias force thereto, the cam profile defining the predetermined neutral position of the bogie beam. The cam profile provides the advantage that the contact between the cam profile and the force transmission head can be controlled to be a non-sliding contact, thus reducing wear. The cam profile may also provide the advantage of controlling the rate of change of position of the bogie beam independently of the rate of movement of the pitch trimmer actuator.

Preferably, the bias force transmission head is rotatable relative to the cam profile. This further reduces possible wear.

Alternatively, the bias force transmission assembly may comprise a toothed pinion gear configured to transmit a rotational force to the bogie beam and at least one toothed rack in engagement with pinion gear, the toothed rack having a contact point configured to engage with the force transmission head of the pitch trimmer actuator. This also provides the advantages of minimising wear, as well as allowing mechanical multiplication of the force applied by the actuator, by selection of gear size and/or ration.

Alternatively, the support member comprises an oleo-pneumatic shock absorber having at least one fluid chamber, wherein the pitch trimmer actuator is integrally formed with the oleo-pneumatic shock absorber and is in fluid communication with the fluid chamber. This has the advantage that a separate pressure accumulator for the pitch trimmer assembly is not necessary.

Alternatively, the bias force transmission assembly may comprise: a mounting bracket located on the support member to which a first end of the pitch trimmer actuator is pivotally coupled at a first pivot point; and an attachment point located on the bogie beam to which a second end of the pitch trimmer actuator is pivotally coupled at a second pivot point, wherein the first pivot point, second pivot point and a third pivot point about which the bogie beam is pivotally coupled to the support member are configured such that they are co-linear on a straight line.

The geometry of this arrangement is such that extension of the pitch trimmer actuator in a single direction drives the bogie beam towards the neutral position regardless of the initial position of the bogie beam.

BRIEF DESCRIPTION OF THE DRAWINGS

By way of example only, certain embodiments of the invention will now be described by reference to the accompanying drawings, of which.

DETAILED DESCRIPTION

Figure 1:
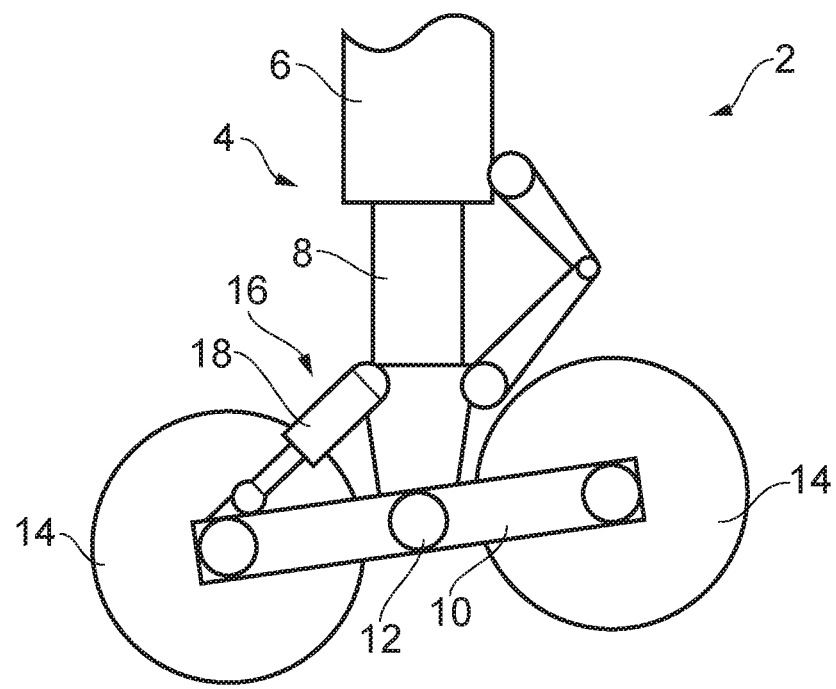
FIG. 1 schematically illustrates an aircraft landing gear having a known pitch trimmer arrangement.

FIG. 1 schematically illustrates a typical arrangement of an aircraft main landing gear including a pitch trimmer assembly that will be readily recognised by the skilled person. The landing gear assembly 2 includes a support member 4 that has an upper portion 6 arranged to be pivotally coupled to the main body of the aircraft (not illustrated) and a lower portion 8 that is slidably received within the upper portion 6. The support member 4 typically, but not necessarily, comprises a telescopic oleo-pneumatic shock strut. The lower portion 8 of the support member is pivotally coupled to a bogie beam 10 by means of a bogie beam pivot pin 12. In the particular example illustrated in FIG. 1, the bogie beam 10 has first and second axles rotatably mounted at either end on which respective pairs of wheels 14 are mounted. In FIG. 1 only a single one of each pair of wheels 14 is illustrated for the sake of clarity. A pitch trimmer assembly 16 is coupled between the lower portion 8 of the support member 4 and the bogie beam 10. The pitch trimmer assembly 16 includes a telescopic pitch trimmer actuator 18 that has a first end pivotally coupled to the lower portion 8 of the support member 4 and a second end that is also pivotally coupled towards one end of the bogie beam 10. It will therefore be appreciated that by controlling the extension or retraction of the pitch trimmer actuator 18, the bogie beam 10 can be rotated about the bogie beam pivot pin 12 so as to orientate the bogie beam 10 relative to the support member 4 as desired.

Figure 2:
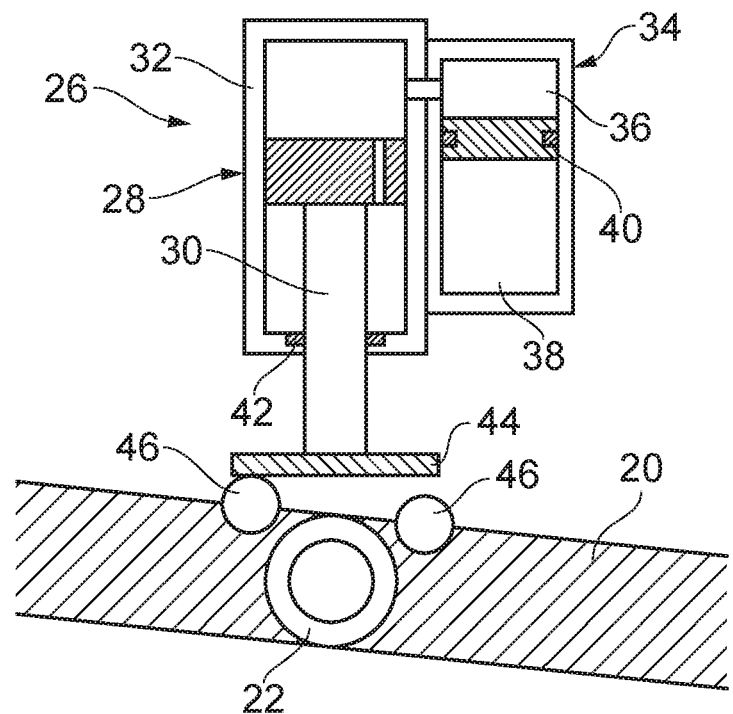
FIG. 2 schematically illustrates a pitch trimmer assembly according to an embodiment of the present invention.

FIG. 2 schematically illustrates some elements of an aircraft landing gear assembly according to an embodiment of the present invention. Not all elements are illustrated for the purposes of clarity. The landing assembly includes a bogie beam 20 that is configured to be pivotally coupled to a support member (not illustrated) by means of a bogie beam pivot pin (not illustrated) as described above with reference to the known aircraft landing gear assembly shown in FIG. 1. In FIG. 2, the bearing housing 22 that is arranged to receive the bogie pivot pin is illustrated for the purposes of indicating the pivot point/axis of the bogie beam. The landing gear assembly also includes a pitch trimmer assembly 26. In the particular embodiment illustrated the pitch trimmer assembly includes a linear pitch trimmer actuator 28 that has an actuator piston 30 slidably received within a piston chamber 32, which is filled with an operating fluid, such as hydraulic oil. The piston chamber 32 is in fluid communication with a hydraulic accumulator 34. The hydraulic accumulator is of a form generally known in the art but in the particular embodiment illustrated comprises a first chamber 36 in fluid communication with the piston chamber 32 of the pitch trimmer actuator 28, and a second chamber 38 separated from the first chamber 36 by a slidable seal 40, or alternatively a fluid tight and impervious membrane. The second chamber 38 contains a compressible fluid such as nitrogen gas, thereby providing a spring medium. A single dynamic seal, or gland, 42 provides a seal between the oil filed piston chamber 32 of the pitch trimmer actuator and the piston 30 so as to prevent oil leakage from the pitch trimmer actuator 28.

The piston 30 of the pitch trimmer actuator has at its free end a force transmission head 44, which in the embodiment illustrated in FIG. 2 comprises a substantially flat plate. The gas pressure within the second chamber 38 of the accumulator 34 (which may be preset by known means) provides a predefined spring force that is transmitted via the hydraulic fluid in the first chamber 36 of the accumulator and the piston chamber 32 of the actuator to the actuator piston 30 as a biasing force. That biasing force is transmitted by the force transmission head 44 to a pair of contact points 46 mounted on the bogie beam 20. The contact points 46 are located either side of the pivot centre of the bogie beam such that the bias force exerted in a first, single, direction by the pitch trimmer piston 30 urges the bogie beam to rotate until both contact points 46 are in contact with the force transmission head 44 of the piston 30, thus biasing the bogie beam into a predetermined neutral position (relative to the support member of the landing gear assembly).

It will be appreciated that irrespective of the initial position of the bogie beam relative to the support member application of the bias force in the same, first, direction will cause the bogie beam to be biased, or urged, towards the desired neutral position. The desired neutral position of the bogie beam can be predetermined by the physical configuration of the contact points 46 (which may also be referred to as contact pads or contact knuckles). For example if the contact pads 46 have the same height relative to the surface of the bogie beam then the neutral position when both contact points 46 are in contact with the force transmission head 44 of the actuator piston 30 will be substantially 90° relative to the longitudinal axis of the actuator piston. If, for example, one of the contact points 46 has a reduced height relative to the other contact point then the neutral position of the bogie beam when both contact points 46 are in contact with the transmission head 44 of the actuator piston will be at an angle of less than or greater than 90° with respect to the longitudinal axis of the piston 30 of the actuator. The same effect may be achieved by mounting the pitch trimmer actuator at an angle relative to the support member, for example, or angling the surface of the force transmission head 44 relative to the longitudinal axis of the piston 30.

The hydraulic/gas accumulator 34 shown in FIG. 2 may, in other embodiments, be omitted with the hydraulic actuator 28 being simply connected to a pressurized hydraulic line. However, the inclusion of the accumulator 34 allows the pitch trimmer assembly to be self-contained which has benefits in maintenance and overall weight of the system.

Figure 3:
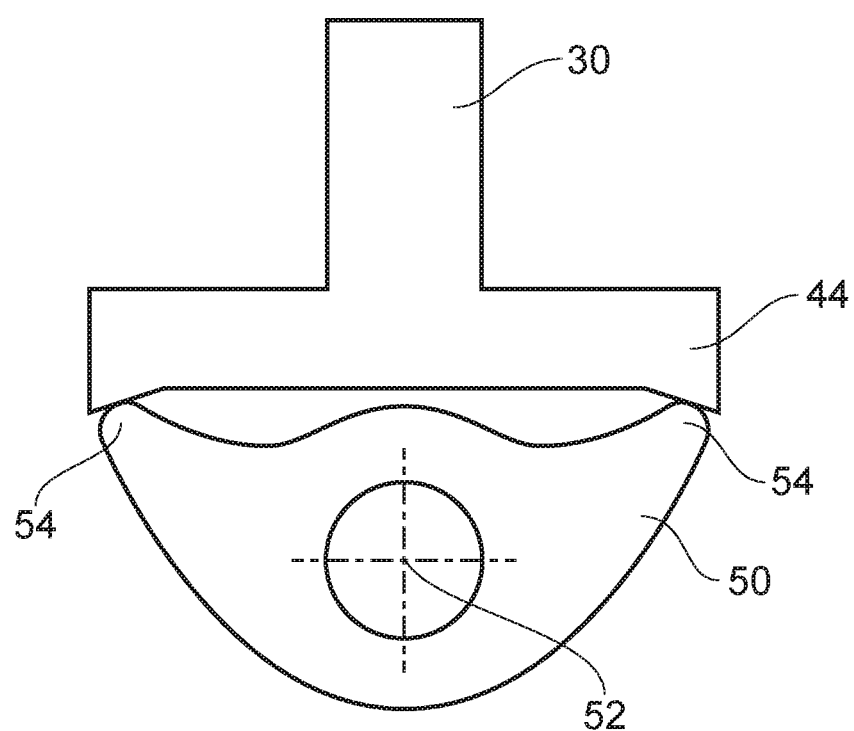
FIG. 3 schematically illustrates a portion of a pitch trimmer assembly according to an embodiment of the present invention.

FIG. 3 schematically illustrates an alternative arrangement of the bias force transmission assembly. In FIG. 3 the bogie beam and main components of the pitch trimmer actuator are omitted for the sake clarity. In FIG. 3, relative to FIG. 2, the contact pads 46 are replaced with a single cam element 50 that is configured to have a centre of rotation 52 that coincides with the rotation centre of the bogie beam. The cam element may, for example, by configured to be mounted on the bogie beam pivot pin, or may be connected to, or formed integrally with, the bogie beam itself. In both alternatives the cam element 50 is configured to be fixed in position with respect to the bogie beam. The cam element 50 has two separate cam lobes 54 that are located either side of the centre rotation 52. The cam lobes 54 perform the same function as the individual contact pads 46 of the embodiment shown in FIG. 2. However, the profile of the cam lobes is such that only a rolling contact patch exists between the cam lobes and the force transmission head 44 during extension of the pitch trimmer actuator. In FIG. 3, the cam element 50 is illustrated in the bogie beam neutral position and therefore both cam lobes 54 are in contact with the force transmission head 44 of the pitch trimmer actuator piston 30. It will therefore be appreciated that in a similar manner to the embodiment shown in FIG. 2, the embodiment shown in FIG. 3 the desired neutral position of the bogie beam can be dictated either by relative rotational mounting of the cam element to the bogie beam, or alternatively appropriate differential shaping of the individual cam lobes 54.

Figure 4:
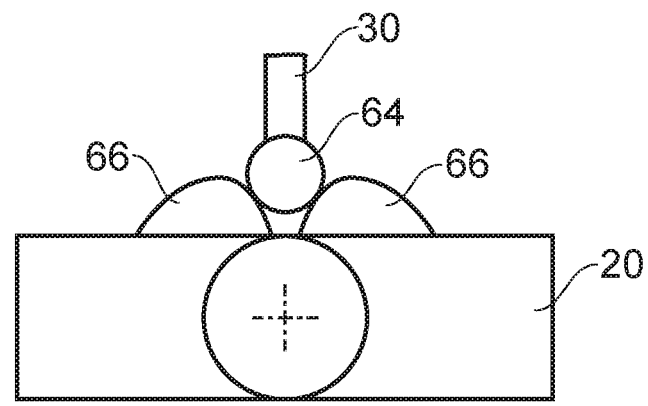
FIG. 4 schematically illustrates a further embodiment of a pitch trimmer assembly of the present invention.

FIG. 4 schematically illustrates a further embodiment in which individual cam elements 66 are provided on the bogie beam 20, either side of the bogie beam pivot point, but the pitch trimmer piston 30 terminates in a cylindrical or spherical force transmission head 64. The cam elements 66 are configured to form a depression, or valley, into which the force transmission head 64 is received and which effectively defines the neutral position of the bogie beam 20. Consequently, adjustment of the desired neutral position can be achieved by the relative positioning of the cam element 66 such that the depression, or valley, is formed to one side or the other of the pivot point of the bogie beam. The cylindrical or spherical force transmission head 64 is preferably rotatably mounted to the piston 30 of the pitch trimmer actuator to enable it to roll over the surfaces of the cam element 66, as opposed to sliding, thereby reducing mechanical wear on the force transmission head 64 and cam element 66.

Figure 5:
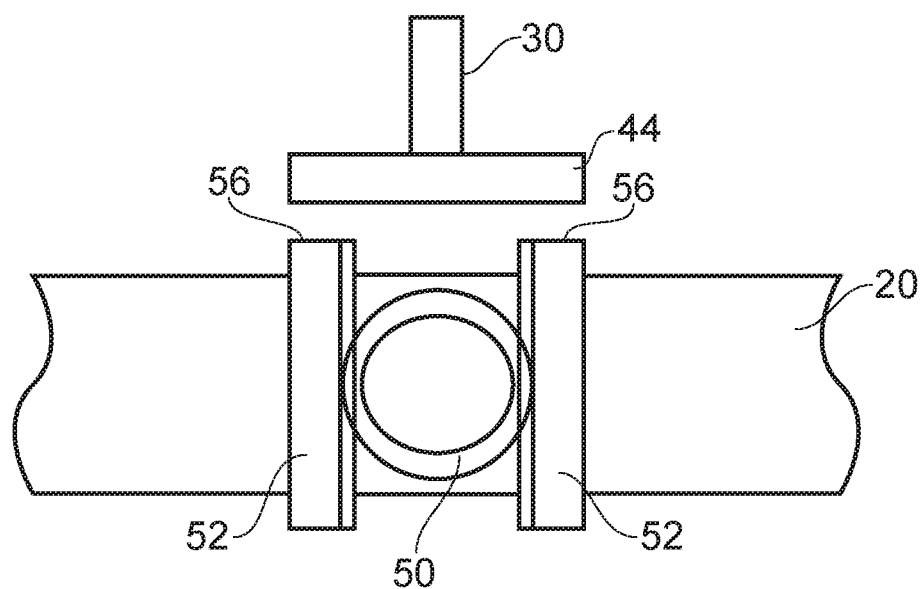
FIG. 5 schematically illustrates a further embodiment of a pitch trimmer assembly according to the present invention.

A further alternative arrangement is illustrated in FIG. 5. In FIG. 5 the pitch trimmer actuator piston 30 and bias force transmission head 44 are generally of the same from as in the embodiment illustrated in FIG. 2. The bogie beam 20 has a toothed gear 50 formed on, or attached, to it centred about the pivot point of the bogie beam. Two toothed racks are slidably mounted on either side of the toothed gear 50, with each rack 52 being in engagement with the toothed gear 50. Each rack 52 is free to move in a direction substantially parallel to the longitudinal axis of the piston 30 of the pitch trimmer actuator as the bogie beam, and hence toothed gear 50, rotates. A first end 56 of each toothed rack 52 is configured to be suitable for being in contact with the force transmission head 44 of the pitch trimmer actuator piston. In use, a pitch trimmer actuator piston will exert a biasing force to one or other of the end surfaces 56 of a respective one of the toothed racks 52 and exert a linear biasing force that will move the toothed rack linearly, thereby imparting rotation of the toothed gear 50 and therefore bogie beam. This will also transmit a linear movement of the opposing toothed rack 52 in the opposite linear direction. When both end surfaces 56 of the toothed racks 52 are in contact with the bias force transmission head 44 of the pitch trimmer piston then the bogie beam 20 will be held in the desired neutral position. The relative orientation of the bogie beam with respect to the other elements of the landing gear assembly can be predetermined by relative positioning of the two opposing tooth racks 52. The use of the toothed racks and tooth gear 50 avoids potential wear arising from sliding or rolling contact between different surfaces, and also provides for the introduction of some mechanical amplification of the bias force exerted by the pitch trimmer actuator, e.g. through the selection of the gear ring and the possibility of further intermediate gear elements.

Figure 6:
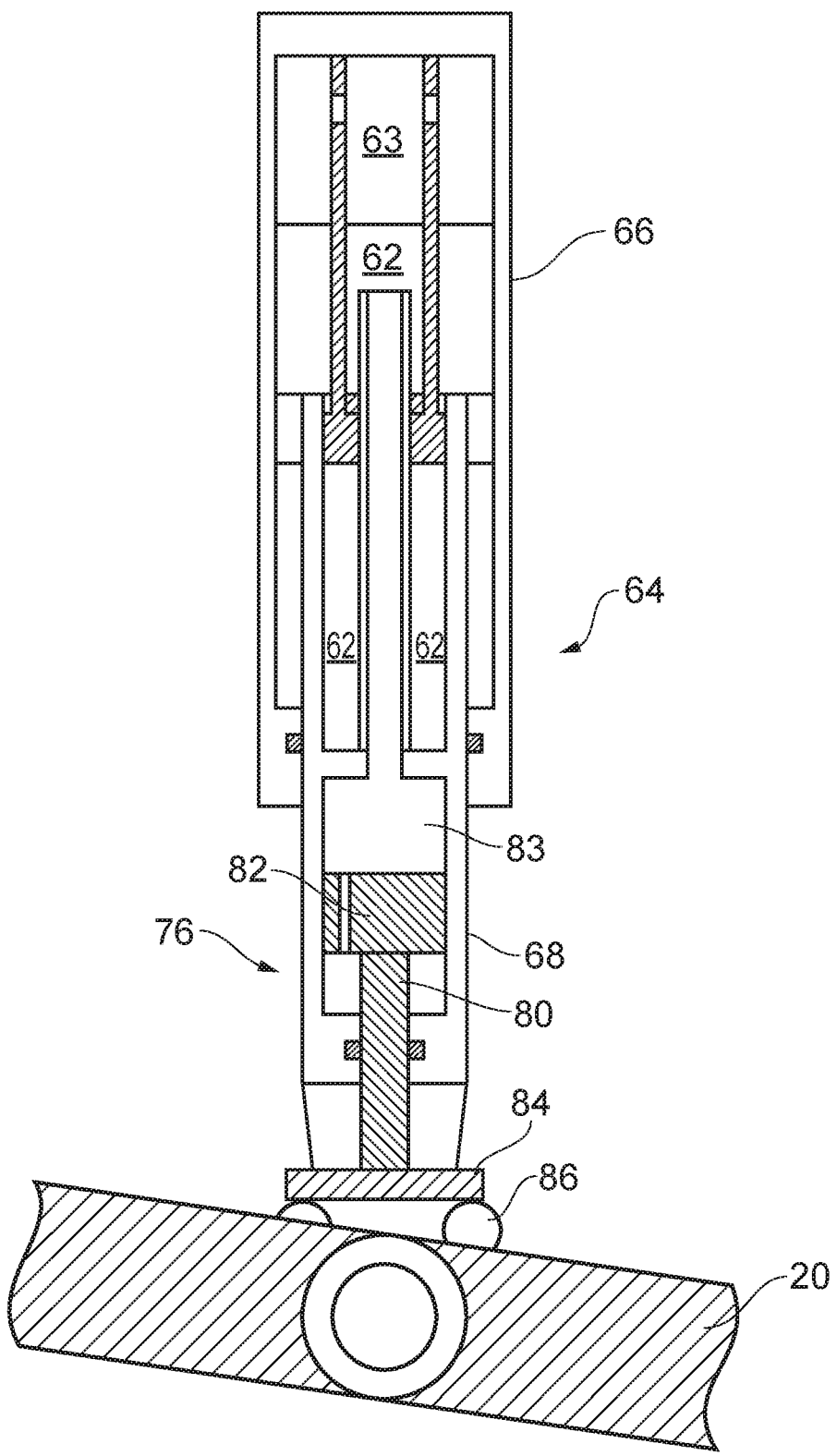
FIG. 6 schematically illustrates a portion of an aircraft landing gear according to an embodiment of the present invention having a pitch trimmer assembly incorporated within a shock strut.

FIG. 6 schematically illustrates an aircraft landing gear assembly according to a further embodiment of the present invention, in which the pitch trimmer actuator is incorporated into the sliding tube (shock strut) of the landing gear. The shock strut 64 is of otherwise a generally conventional construction, having an upper cylindrical portion 66 having a first end arranged to be coupled to a portion of the aircraft structure (not illustrated), and a lower portion 68 slidably received within the upper portion 66. Hydraulic oil 62 and gas 63, such as nitrogen, are contained within the upper and lower portions. The pitch trimmer actuator 76 is incorporated into a portion of the lower portion 68 of the shock strut in an area that would ordinarily be devoid of further structures. The pitch trimmer actuator is otherwise as described with reference to FIG. 2, having a piston 80, internal piston head 82 located within an oil filled chamber 83, and a biasing force transmission head 84 arranged to be in contact with a number of contact pads or knuckles 84 formed on the bogie beam 20. The oil filled chamber 83 of the pitch trimmer actuator 76 is in fluid communication with the hydraulic oil within the main shock strut 64. As a consequence, the compressible gas 63 within the shock strut, which primarily provides a spring function for the telescopic shock strut, also provides the desired spring force within the pitch trimmer actuator thereby removing the need for a separate accumulator (as illustrated in FIG. 2). The incorporation of the pitch trimmer actuator within the shock strut provides a number of advantages including a reduced susceptibility to the leakage of hydraulic fluid or spring gas, due to the greater capacity of the shock strut, plus there is only a single device to monitor and replenish fluid levels as necessary. Also, the loss of fluid in the main shock strut will be easier to identify as it will cause a reduction in the exposed portion of the lower portion 68 of the shock strut under ground loading (i.e. the upper and lower portions of the shock strut will be more compressed than normal). However, it is also possible in alternative embodiments for the pitch trimmer 76 to be fluidly isolated from the shock strut 64, in which case an additional connection to an independent pressurised fluid supply, or separate pressure accumulator, is required.

As an aside, in FIG. 6 it will be noted that the two contact pads 86 against which the bias force transmission head 84 of the pitch trimmer actuator is in contact are not similarly sized. This, as previously described in relation to FIG. 2, gives rise to a desired neutral position of the bogie beam 20 in which the longitudinal axis of the bogie beam and pitch trimmer actuator are not orthogonal with respect to one another.

Figure 7:
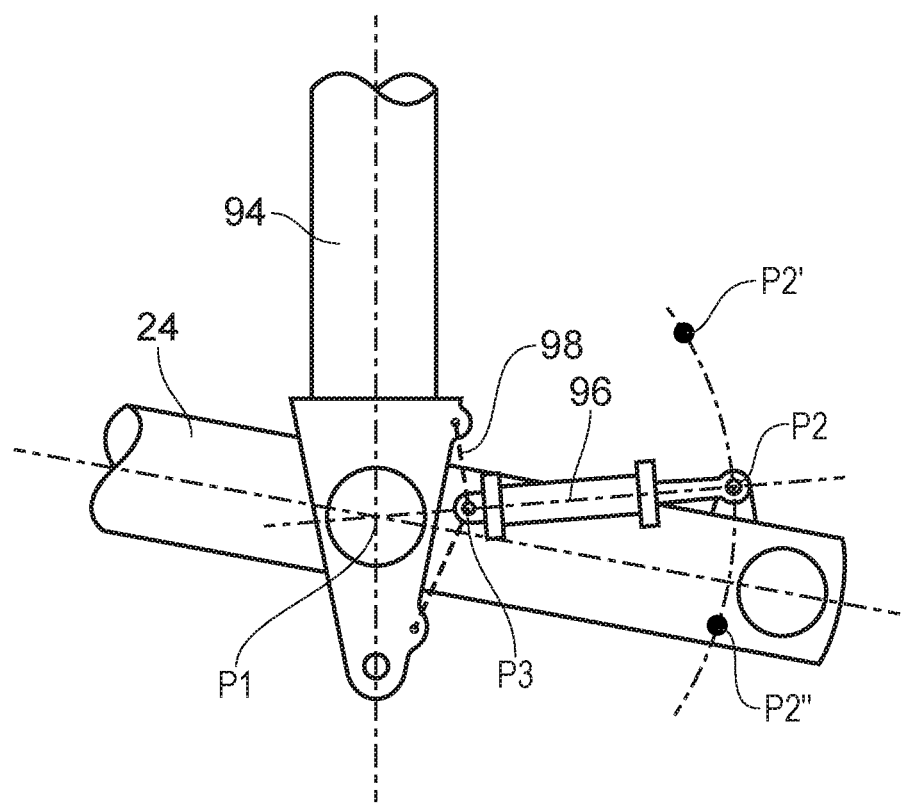
FIG. 7 schematically illustrates a further embodiment of an aircraft landing gear according to the present invention.

FIG. 7 schematically illustrates a landing gear assembly according to a further embodiment of the present invention. As with the embodiments previously described, a bogie beam 20 is pivotally coupled to a lower portion of a support member or shock strut 94. The pivot axis of the bogie beam with respect to the support member is labelled P1 in FIG. 7. A telescopic pitch trimmer actuator 96 is pivotally coupled at a first end to the bogie beam 20 and at a second end to a pitch trimmer mounting bracket 98, shown in FIG. 7 in a broken outline. The mounting bracket 98 and the attachment point at which the pitch trimmer actuator 96 is pivotally coupled to the bogie beam are located such that the attachment point of the pitch trimmer actuator to the bogie beam (labelled P2 in FIG. 7) are geometrically arranged such that the pivot point P3 at which the pitch trimmer actuator 96 is pivotally connected to the mounting bracket 98 is located in between the pivot point P1 of the bogie beam 20 and support leg 94 and the attachment point P2 of the pitch trimmer actuator 96 and the bogie beam. The attachment bracket 98 and attachment point of the pitch trimmer actuator to the bogie beam are configured such that when the bogie beam is in the desired neutral position, as indicated in FIG. 7, the two attachment points P2 and P3 of the pitch trimmer actuator to the bogie beam and mounting bracket 98 respectively, and the pivot point P1 of the bogie beam and support member are substantially aligned on the same axis, indicated by the chained line in FIG. 7. As a result of this geometry, rotation of the bogie beam in either direction away from the desired neutral position causes the attachment point P2 of the pitch trimmer actuator to the bogie beam 20 to move through an arc indicated by the broken curved line in FIG. 7 such that placement of the pivot point between the pitch trimmer actuator and bogie beam (P2) anywhere along that arc, for example at point P2' or P2", results in the pitch trimmer actuator 96 being placed in compression. The inherent spring force within the pressurised pitch trimmer actuator will cause the actuator to exert a biasing force urging the actuator out of compression and thereby urging the bogie beam back towards the neutral position.

However, in the embodiment illustrated in FIG. 7 the pitch trimmer actuator 96, as is the case with the other embodiments illustrated in the previous Figures, only exerts a biasing force in a first, single, direction and therefore only requires a single dynamic seal or gland.

The invention claimed is:

1. An aircraft landing gear assembly comprising:
a bogie beam pivotally coupled to a support member, the bogie beam having a predetermined neutral position relative to the support member; and
a pitch trimmer assembly including a pitch trimmer actuator configured to exert a biasing force in a first direction and a bias force transmission assembly configured to receive the biasing force, wherein the bias force transmission assembly comprises a bias force transmission head at the free end of the pitch trimmer actuator and a pair of contact points on the bogie beam either side of the pivot axis of the bogie beam, the contact points being configured to receive the biasing force from the bias force transmission head and to define the predetermined neutral position of the bogie beam, wherein both contact points are in contact with the bias force transmission head when the bogie beam is in the predetermined neutral position.

2. The aircraft landing gear assembly according to claim 1, wherein the contact points are asymmetrically shaped.

3. The aircraft landing gear assembly according to claim 1, wherein the bias force transmission assembly comprises a toothed pinion gear configured to transmit a rotational force to the bogie beam and at least one toothed rack in engagement with the pinion gear, the toothed rack having a contact point configured to engage with the force transmission head of the pitch trimmer actuator.

4. The aircraft landing gear assembly according to claim 1, wherein the support member comprises an oleo-pneumatic shock absorber having at least one fluid chamber, wherein the pitch trimmer actuator is integrally formed with the oleo-pneumatic shock absorber and is in fluid communication with the fluid chamber.

5. The aircraft landing gear assembly according to claim 1, wherein the contact point of the bias force transmission assembly comprises a cam profile, the bias force transmission head being configured to contact the cam profile and transmit the bias force thereto, the cam profile defining the predetermined neutral position of the bogie beam.

6. The aircraft landing gear assembly according to claim 5, wherein the bias force transmission head is rotatable relative to the cam profile.

7. The aircraft landing gear assembly according to claim 1, wherein the pitch trimmer actuator comprises a single gland linear actuator.

8. The aircraft landing gear assembly according to claim 7, wherein the pitch trimmer actuator comprises a hydraulic actuator.

9. The aircraft landing gear assembly according to claim 8, wherein the pitch trimmer assembly includes a hydraulic accumulator.

10. An aircraft landing gear assembly comprising:
a bogie beam pivotally coupled to a support member;
a pitch trimmer assembly including a pitch trimmer actuator configured to exert a biasing force in a first direction to bias the bogie beam towards a predetermined neutral position relative to the support member;
a mounting bracket located on the support member to which a first end of the pitch trimmer actuator is pivotally coupled at a first pivot point; and
an attachment point located on the bogie beam to which a second end of the pitch trimmer actuator is pivotally coupled at a second pivot point,
wherein the first pivot point, second pivot point and a third pivot point about which the bogie beam is pivotally coupled to the support member are configured such that they are substantially aligned such that rotation of the bogie beam away from the neutral position results in compression of the pitch trimmer actuator in an opposite direction to the biasing force.

* * * * *